Patented May 6, 1924.

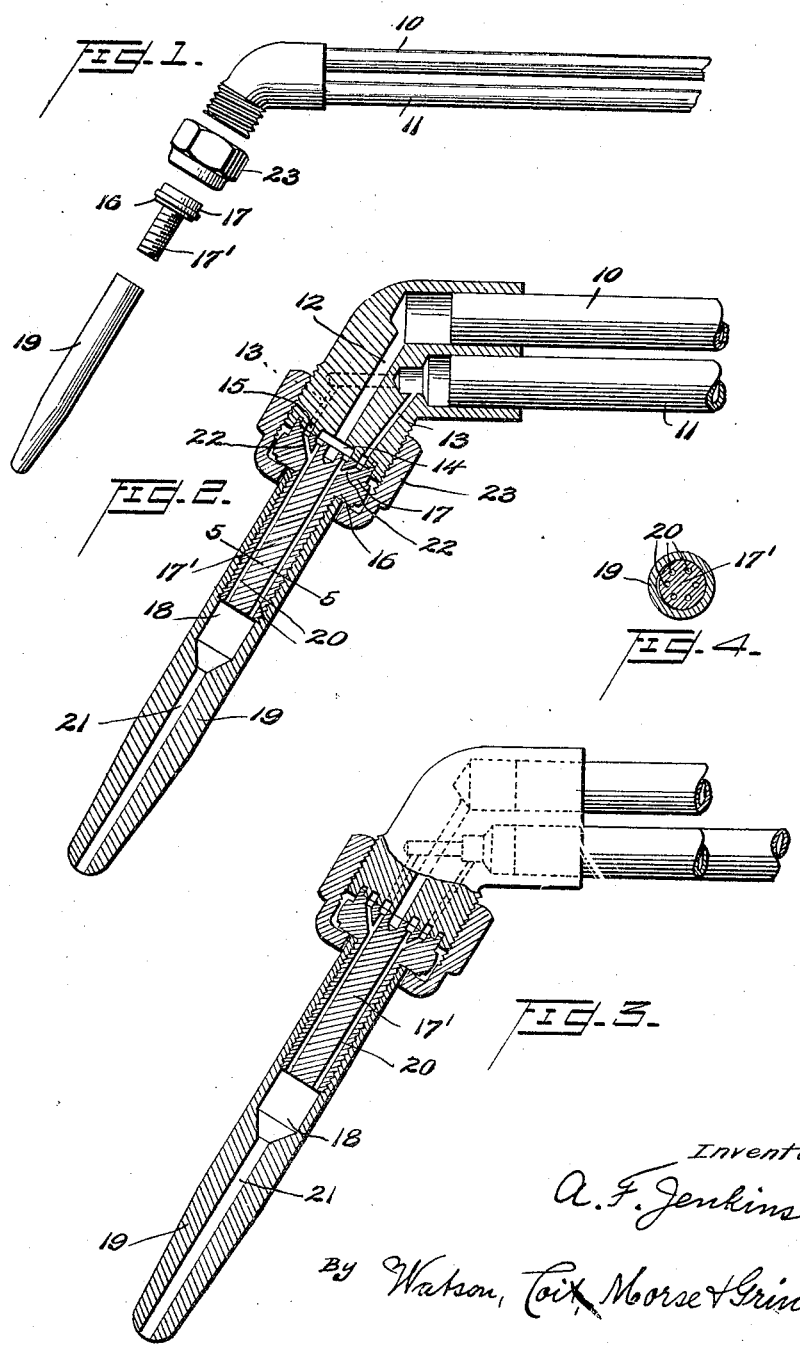

1,492,635

UNITED STATES PATENT OFFICE.

ALEXANDER F. JENKINS, OF BALTIMORE, MARYLAND.

WELDING TORCH.

Application filed May 31, 1921. Serial No. 473,794.

*To all whom it may concern:*

Be it known that I, ALEXANDER F. JENKINS, a citizen of the United States, and residing at Baltimore city, State of Maryland, have invented certain new and useful Improvements in Welding Torches, of which the following is a specification.

This invention relates to tips for gas burning torches and particularly to tips for welding operations.

An object of the invention is to provide a tip of this class which may be secured to the head of either a cutting or a welding torch and which, in either position, will effect a thorough mixing of the gases supplied so that a perfect and complete combustion of these gases results. The tip is designed and constructed to prevent "flash back" or ignition of the gas in the interior of the tip. It may be fabricated easily, is substantial and enduring in use and is well able to withstand the greatest heat without injury, though made in two parts for purposes of convenience.

One form of the invention is illustrated in the accompanying drawings in which:

Figure 1 is a disassembled view, in elevation, of the welding torch head and tip;

Figure 2 is a longitudinal section of the assembled head and tip;

Figure 3 is a section through a portion of the head of a cutting torch showing the improved welding tip attached thereto; and Figure 4 is a section on line 5—5 of Figure 2.

The torch head illustrated in Figures 1 and 2 is that of a welding torch having two conduits 10 and 11 for bringing gases thereto, preferably oxygen and acetylene, and passages 12 and 13 through the head for the conduction of these gases to the annular grooves 14 and 15 respectively. The tip comprises two portions, a rear portion 16 which has an enlargement 17 for abutment against the head of the torch and a forwardly extending part 17' which is cylindrical in shape and externally threaded to have threaded engagement with the inner wall of an axial chamber 18 in the front portion 19 of the tip. The chamber 18 is longer than the extension 17, leaving between the front and rear portions of the tip, a gas mixing chamber which is in communication with the gas mixing passages 20 of the rear portion 16 and the single gas mixing passage 21 of the front end of the tip. The gas mixing passages 20, as shown in Figure 5, are arranged in a circle transversely of the tip and the upper end of each passage communicates with both grooves 14 and 15 of the head, branches 22 being provided to connect groove 15 with the respective mixing passages 20.

The front wall of the intermediate mixing chamber 18 is inclined and the gases under pressure issuing from the mixing passages 20 strike these inclined walls and are deflected to form a vortex in which the gases are intimately mixed. After this second mixing the gases flow through passage 21 and in this travel a third mixing action is realized so that the gases issuing finally from the orifice in the forward end of the tip are intimately mixed, and in the operation of the torch no gas is wasted due to its being blown away unburned. The tip is secured to the head by a nut 23, which has threaded engagement with the head and the forward end of which is inturned and fits closely around the rear end of the portion 19 of the tip and completely covers up the joint between this portion 19 and the rear portion 16 so that this joint is protected to a great extent from the heat. In Figure 3 a welding tip is shown attached to a cutting torch and in this case the central solid portion of the rear end of the tip completely blocks off the cutting oxygen passage 29 so that no cutting oxygen may pass from the head.

The mixing of the gases in three stages insures that no portion of either gas used will be unconsumed thereby either oxidizing or carbonizing the weld and also effects a considerable saving in gases. The provision of a plurality of restricted mixing passages of small size prevents the well known flash back which occurs often to annoy and consume the time of the operator and cause loss of gas. The practical considerations of the manufacture of the improved tip will be readily realized by those skilled in the art. By making the tip in two parts and fitting one part within the other the intermediate mixing chamber may be readily formed, which is impossible in the case of one part tips, and furthermore the tip may be easily cleaned at any time by removing it from the head and unscrewing the two parts so that the passages are readily accessible.

Having thus described the invention what

I claim as new and desire to secure by Letters Patent is:

1. A two part welding tip including a forward part having a longitudinal passage therethrough, the rear portion of which passage is enlarged to form a chamber, and a rearward part extending into and constituting a closure for the rear end of said chamber, said rear part having gas sealing surfaces on its rear face and making gas tight contact with the wall of said chamber, said rearward part also having gas passages formed therein and the portion of said chamber in advance of the rearward part constituting a mixing chamber in communication with the passages of both parts.

2. A two part welding tip including a forward part having a longitudinal passage therethrough, the rear portion of which passage is enlarged to form a cylindrical chamber, and a cylindrical rearward part extending into and constituting a closure for the rear end of said chamber and having threaded engagement with the wall of said chamber, said rearward part having a plurality of gas passages formed therein and the portion of said chamber in advance of the rearward part constituting a mixing chamber in communication with the passages of both parts.

In testimony whereof I hereunto affix my signature.

ALEXANDER F. JENKINS.